Jan. 10, 1956           F. A. KROHM           2,730,078

FLUID MOTOR FOR WINDSHIELD WIPER

Original Filed May 11, 1949           5 Sheets-Sheet 1

INVENTOR.
FRED A. KROHM
BY
Charles S. Penfold
ATTORNEY

INVENTOR.
FRED A. KROHM
BY
Charles S. Penfold
ATTORNEY

INVENTOR.
FRED A. KROHM
BY Charles S. Perfilt
ATTORNEY

Jan. 10, 1956    F. A. KROHM    2,730,078
FLUID MOTOR FOR WINDSHIELD WIPER
Original Filed May 11, 1949    5 Sheets-Sheet 5

INVENTOR.
FRED A. KROHM
BY Charles S. Penfold
ATTORNEY

United States Patent Office 2,730,078
Patented Jan. 10, 1956

2,730,078

FLUID MOTOR FOR WINDSHIELD WIPER

Fred A. Krohm, Hobart, Ind., assignor to Productive Inventions, Inc., a corporation of Indiana Continuation of application Serial No. 92,634, May 11, 1949. This application January 7, 1955, Serial No. 480,510

17 Claims. (Cl. 121—97)

This invention relates generally to power units, and more particularly, has to do with a windshield wiper motor of the fluid type.

An object of this invention is to provide a windshield wiper motor of the fluid drive type, which may be used for replacement purposes more readily than motors heretofore available because of its embodiment of features which give it substantially universal adaptability to the widely varying dimensional limitations and other conditions encountered in replacing fluid drive motors supplied as original equipment for automotive vehicles.

Such original equipment motors, in part because of the materials and methods used in their production, and in part because of their mechanical features, deteriorate functionally in service and require replacement. Within a period much shorter than the average useful life of the automobile in which mounted such original equipment motors frequently become almost completely inoperative from such deterioration, which includes as one of its more important features, the wearing away of the material in the raceway of the reciprocal vane employed to propel the activating shaft of the motor. Such wearing away increases steadily and, as it increases, the efficiency or power of the motor decreases because of the growing proportions of leaks which occur between the vane and the raceway. Efforts to restore the efficiency of the motor by installing a new vane and/or a new resilient seal between the vane and the raceway are only partially successful. The installation of a new raceway is not practiced to any appreciable extent because of mechanical difficulties to be encountered if attempted within the scope of the facilities ordinarily available to a service station of the average type at which such replacements are made.

Another object of the invention is to provide a method of adapting a fluid driven replacement windshield wiper motor, without physical alterations in the internal moving parts thereof, to varying performance requirements of different makes and models of motor vehicles having, respectively, different constructions and arrangements of operatively connected windshield wiper arms and blades and of shafts for the actuation thereof, and having, respectively, different constructions and arrangements of linkages or other operative connections between said motor and said shafts, whereby a wiper blade impelled by said motor is parked adjacent whichever of the two extremes of its normal stroke may correspond to the original equipment practice peculiar to that particular make and model of motor vehicle.

One great impediment to the timely replacement of vacuum wiper motors for maximum driving safety is the great variety of motors required to meet the great variety of conditions inherent to different makes and models of automobiles. One of the problems encountered in providing universality in such replacement motors arises from the fact that on some makes and models of vehicles, the normal parking position of the blade is at one end of the stroke while on other vehicles it is at the other end of the stroke. Heretofore, no method has been known whereby, in a single motor, and without alterations to its internal mechanism, the operator of the motor could, selectively and at his option, with equal facility park the arms and blades adjacent either end of the stroke.

A further novel method residing in the subject invention involves the use of means controlling the application of fluid pressures selectively to one side or another of the primary impelling member of the motor to cause parking of said member and operatively related parts adjacent one or the other of the extremes of its stroke.

Other novel methods of importance in achieving useful results in the subject invention are apparent in the drawings and specification hereof.

Wear of the raceway becomes of serious proportions usually within two or three years of usage. When it is considered that approximately 29 million of the automobiles and trucks registered at the end of the year 1948 were manufactured before World War II, it will be understood that the need for the subject invention has been a truly serious need.

As will appear hereinafter, besides the wear of the raceway, there are other important deteriorations and losses of efficiency that develop in the original equipment type of fluid drive motors (ordinarily called vacuum motors) which contribute to the necessity for replacements of the complete motor. Such original equipment motors are replaced each year in very large numbers running well into the millions of motors.

Because of frequent model changes by vehicle manufacturers, it has been necessary for the manufacturer of an original equipment fluid drive motor to vary the shape, size and dimensions of various functional parts of such motors to adapt them to a particular model of vehicle. As a result, there have accumulated over the years in the cataloging of such fluid drive motors, a very large number of models, shapes and sizes necessary for the retail service station to carry in stock in order that any substantial percentage of models of automotive vehicles requiring such service may be serviced promptly from the motor inventory on hand. It has only been practicable, heretofore, to replace such fluid drive motors with motors identical in each instance with the motor to be replaced and identical with it as to source of manufacture.

Because of the heavy and varied assortments of original equipment replacement motors required to be carried in inventory by the retail automotive outlet, comparatively few of such outlets carry any considerable range of models of replacement motors, and most automotive retail outlets carry none. Therefore, car owners are disinclined to spend the time necessary to seek out a service station able to give them prompt replacement, and are inclined to neglect such replacement, even of motors that have lost much of their efficiency, with the result that the hazards of driving, are increased not only for the owner of the particular vehicle so equipped with incompetent wiper motors but also for others.

As indicated, a purpose of the subject invention is to greatly reduce the number of motors required to be carried in retail and wholesale replacement inventories, so as to encourage and enable a much larger number of wholesalers and retailers to provide such service, to the end that driving and walking on the streets and highways will become less hazardous.

A further purpose of the invention is to provide a construction for and method of throttling the application of fluid pressures to the motor so as to facilitate control of the performance of the motor by the operator of the vehicle. For example, the manual control devices ordinarily used for starting, regulating, stopping and parking such motors are unsatisfactory in that they permit the abrupt cutting off of the fluid pressure from normal wiping operations with the result that the parking of the blade and arm often is abrupt and violent, causing slapping of the blade and/or arm against the frame of the windshield in a manner that causes them to deteriorate at an abnormally rapid rate. As will appear hereinafter, the subject invention prevents such undesirable abruptness in the control of fluid pressure and prevents the violent overthrow of the blade and arm beyond normal parking limits. The subject invention provides a throttling method and structure which promotes "cushioning" of the parking operation.

Figure 1:
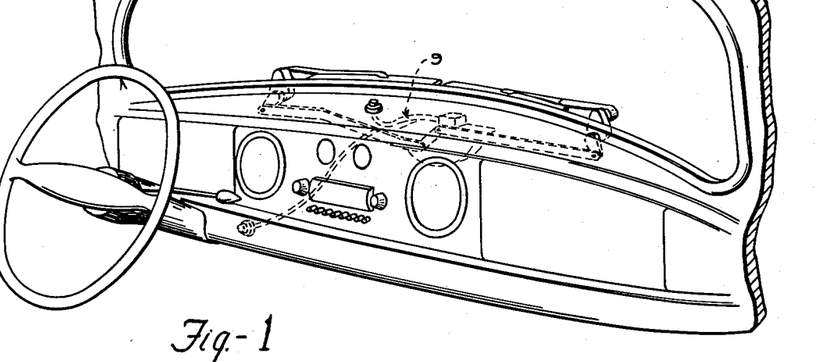
Figure 1 is a diagrammatic view of an instrument panel assembly of an automotive vehicle exemplifying a unique valve control unit which may be installed in a plurality of various convenient positions, two of such positions being illustrated.

Another object of the invention is to provide a method of and structure for manual control of the throttle (which in turn controls fluid pressure) which lends itself readily to installation for replacement purposes and can be adapted, in installation, as well to one as another of the positions of the motor with relation to the control member exposed for manual contact. There are so many different positions of the exposed manual control member (exposed usually externally of the instrument panel of the automobile at a point within convenient reach of the operator's hand) relative to such a variety of intervening obstructions in the way of wires, linkages, etc. disposed in the limited space available, as to have seriously obstructed all previous efforts to provide a substantially universal replacement for such fluid drive motors. The subject invention, as will be seen, provides within practicable ranges, unlimited adaptability to these varying conditions and permits ready installation of the motor and the exposed manual control member with a connection therebetween which operates with equal and complete success regardless of the position of the motor with relation to the position of the exposed manual control member. The exposed manual control member obviously may be installed in any desired position at the top or at the front of the instrument panel (as indicated in Figure 1). The exposed manual control member is readily adaptable, therefore, to installation in the same position as the corresponding original equipment member, without the necessity for drilling a new hole in the supporting panel.

Another purpose of the invention is to provide throttling mechanism (Figure 15) and control mechanism (Figure 2) therefor which will permit the parking of the wiper blades adjacent either end of their arcuate stroke, without any alteration in the structure, and entirely at the option of the operator of the vehicle. This feature becomes important in a replacement motor because some of the original equipment installations part normally at one end of the stroke while others park normally at the opposite end of the stroke. These opposing characteristics naturally require the use for replacement of a different model and design of motor, when replacements other than those identical with the original equipment installation are not available. Thus the invention removes one of the further and important obstructions to universality.

Figure 2:
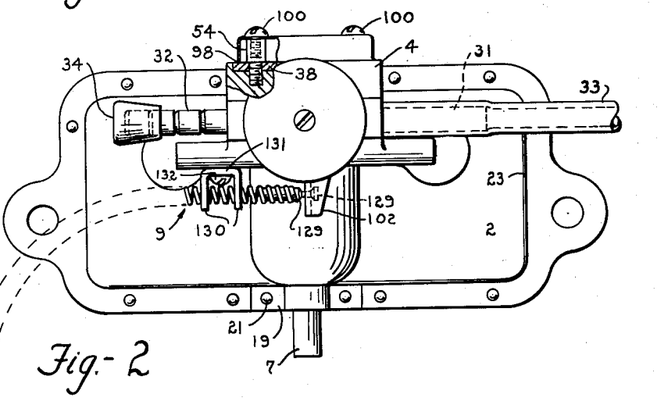
Figure 2 is a top view of a vacuum type windshield motor showing the valve control assembly operatively associated therewith.
Figure 3:
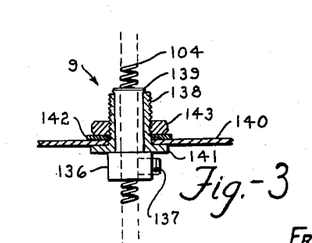
Figure 3 is a view showing a component of the control unit.

A further object of the invention is to remove still another obstruction to universality occasioned by the fact that such original equipment motor may have the hollow nipple over which the rubber hose is fitted extending from the motor in a given direction (toward the right-hand side of the car, for example) or on another model extending from the motor and in an opposite direction. This makes inconvenient, if not impossible, the connection of such hose with any motor having such hollow nipple on a side of the motor opposite to that from which the hose approaches the motor. The subject invention provides a novel construction and arrangement of channeling of fluid conduit which permits the attachment of said hose to either side of the motor so that, regardless of the angle of approach of the hose, it may be as readily connected to the motor as if it were identical with the original equipment motor which it replaces, which construction permits the closure of the opposite nipple by a rubber cap (as shown in Figure 2).

Another object of the invention is to provide an improved valving device for automatically alternating fluid pressure (or suction) at opposite sides of the driving vane. Ordinary devices for this purpose are bulky and require a space allowance which restricts the lateral cross-sectional dimension of the raceway of the motor, and thus restricts the over-all power of the motor. Such ordinary valve devices also involve the use of die cast parts which are costly—and are inclined, particularly after considerable wear, to develop leakage between the surfaces of relatively moving contacting members. The subject invention embodies a valving device constructed and arranged to employ much less costly punch press parts and to provide a subassembly of thinner structure which permits adding to the lateral cross-sectional dimension of the motor raceway without adding to the over-all width of the complete motor assembly. It will be noted by reference to the drawings and to the following specification, that the subject valving device creates the "flip" of throw of the valve, from one extreme position to the other, by the use of opposed identical external cams which react to a common spring, whereby the rate of wear on each of these two cams is approximately one-half of the rate of wear on a single cam if used for the purpose, and the spring pressure created by the two opposing cams is balanced so as to avoid unequal urging of the motor shaft which carries the dual-faced internal cam. The external cams may be made of cloth impregnated plastic such as commonly used elsewhere in automobile cams or levers subject to wear, thus to minimize noise of operation.

Another purpose of the invention is to provide a floating valve member responsive to fluid suction and thereby held in uniform and constant contact with the opposing face, carrying terminals of conduits, so that any tendency to create or permit leakage between the valve member and the face will be minimized.

Another object of the invention is to provide a two-ended key or cross member 90 for engagement with the motor shaft, each of said ends being constructed and arranged to contact and urge forward inner portions of the internal cam member, said cross member being readily removable for substitution of a different cross member being wider or narrower at said ends so that the over-all degree of arcuate movement of the windshield wiper arm may be varied to suit varying requirements of different motor vehicles. By this method and structure, a still further obstruction to universality of design and application of replacement windshield wiper motors of the vacuum type is substantially eliminated. It will be noted that the cross member may provide at the opposite sides of its end portions a different effective width, so that by reversing its position, a different over-all degree of arcuate movement of the windshield wiper arm may be provided.

A further object of the invention is to provide a throttling method and mechanism constructed and arranged so that, without alteration of such construction and arrangement, movement of the throttle from its median position in either direction will produce reversely a substantially identical performance of the driving vane of the motor.

Another object of the invention is to provide a valve assembly and mounting plate therefor, which may be assembled separately of the motor, may be installed in the complete motor assembly as a pre-assembled unit, and thus may be replaced independently of any other replacement, when and if for any reason required to be replaced.

Another object of the invention is to provide a novel construction and arrangement of parts and assembly whereby essential characteristics of parts may be readily attained by the use of conventional punch press equipment and processes, thus facilitating volume production. As an example, it is common practice to die cast the raceway and mounting frame in one piece. Besides limiting the raceway to die cast materials, which are less resistant to wear, this one-piece die cast member must be made in various sizes and shapes to meet the varying dimensions and locations of different mounting brackets to which such motor must be attached. This means the costly construction and maintenance of elaborate die casting dies in various shapes and sizes.

In the subject invention, the raceway housing 10 is drawn out of sheet metal, preferably aluminum, the frame 3 is formed separately and may be formed of a different metal such as stainless steel, to give greater strength than die cast material or aluminum. Thus, by making this assembly in two pieces a different material may be used in each piece, to obtain in each piece characteristics most desirable. The raceway housing is nested in the frame and is held in such frame by spot welding or riveting thereto or otherwise.

A number of important advantages are obtained through this novel two-piece construction and arrangement of raceway housing and frame. To meet the requirements of different locations of mountings it is only necessary to vary the dimensions of the frame. Thus all of the raceway housings of a given size or power category of the motor remain identical and their production may continue uninterrupted for die changes in the presses. This accomplishes substantial savings in cost because production runs of the raceway housing extend to the sum total of all of the motors to be manufactured in that power category.

The rate of wear in a frictional raceway such as is employed in the subject invention is influenced by the disposition of the grain of the metal toward the direction of travel of the vane, for example. By forming the raceway as herein described, the grain of the metal may be disposed at any desired angle and thus the durability of the raceway may be enhanced. Die cast metal is relatively porous and is without uniform grain.

Ordinary care in handling of materials for production and parts in production, provides a substantially smooth and uniform contact surface in the raceway, without applying a finishing operation. When the raceway housing is formed of aluminum, its interior frictional surfaces may be chromium-plated by well-known methods which give the raceway a flint-like hardness difficult even to scratch with a file. Thus the method and construction and arrangement herein described result in a motor raceway housing and frame assembly more desirable both from the standpoint of (1) facilitating volume production, and (2) increasing resistance to wear of critical parts.

It may be added that to attempt by punch press methods to form the raceway housing and frame integrally out of one blank would introduce serious problems of which no practicable solution has been found within permissible cost ranges. It will be noted that the top marginal edges of the raceway housing must be substantially uniform and true to permit a tight seal against the cover to prevent leakage under vacuum. The raceway housing which forms a part of the subject invention is readily held substantially true and uniform at edges to which such seal is required. Any attempt to form these two pieces integrally from a single blank would result in a comparatively irregular surface at the area of seal. Thus the degree of perfection of seal required for practical results could not be attained, even by subjecting the part to so large a number of operations as would make the cost of the part prohibitive.

It will be noted that the narrow top marginal edges of the raceway housing must conform accurately to that portion of the cover recessed for the purpose of receiving it in sealed relationship. In perfecting this seal, a thin gasket usually is employed.

Another object of the invention is to facilitate replacements where necessary, and to minimize their cost, by providing detachable subassemblies which are readily replaceable, such as the mounting block. It will be noted that on this block (which, on account of its various functions and multiple passages may be a die casting) carries the throttle valve and the valving assembly. By removing this one block with the throttle and the valving mechanism attached to it, substantially the entire functional structure of the invention may be replaced—or any of the three elements (throttle, valving mechanism or mounting block) may be replaced.

Another object of the invention is to provide an improved construction and arrangement of parking seals 51 and 52 by which the vacuum may be sealed against the inner surface of the cover 2 when the vane 12 is in parking position. It will be noted that two directly opposite resilient cup-like parking seals are mounted, one on either side of the vane, so that the vane may be parked at either end of its stroke and the wiper arms and blades may be parked correspondingly at either end of their stroke.

It is obvious that when the motor is made for original equipment of an automotive vehicle where all functional and dimensional requirements are predetermined, those structural and functional features of the invention introduced solely to provide universality may be omitted and their cost avoided. For example, only one vacuum seal would be required because the vane would park only at one predetermined end of its stroke. Only one hollow nipple is required, since the vacuum hose would approach always from a predetermined side.

The outer end of motor shaft 7 may be so constructed and arranged as to be readily adaptable to the type of linkage preferred for connecting it operatively to the wiper arm and blade.

One important object of the invention is to provide an improved primary valve body having a unique arrangement of passageways and ports by which the size and weight of the body may be materially reduced.

Another object of the invention is to provide a primary valve seat and a valve embodying improved principles of design and construction whereby it may be caused to automatically adjust and seal itself with respect to the seat, including means extending through the valve into the body for detachably holding the valve in place.

A significant object of the invention is to provide a primary valve and a control assembly with unique means for operatively connecting the valve with the control assembly.

Another object of the invention is to provide a set-up whereby the unique means employed for operatively connecting the valve and control assembly together may be manipulated to either of two positions for predetermining the rotational range of the primary valve so that the wiper arm and blade assembly may be parked only at either side of a windshield.

An additional object of the invention is to provide a filter for filtering the air admitted into the chamber or raceway of the motor, including a novel arrangement for securing the filter in operative position.

A further object of the invention is to provide improved means concealed from view for securing the primary valve body to the mounting plate.

A still further object of the invention is to provide means for rendering the secondary valve operating mechanism substantially noiseless.

Also, an object of the invention is to provide a system of valving whereby the wiper arm attached to the motor shaft may be eased into a parking position and thereby avoid the objectionable slap of a wiper blade against the frame of the windshield.

Other objects and advantages of the invention will become apparent after the description hereinafter set forth is considered in conjunction with the drawings annexed hereto.

Referring to the drawings, wherein like parts are designated by the same numerals.

Figure 14 is a vertical section taken through an appropriate part to illustrate details of construction;

Figure 15 is a vertical section taken through an appropriate part of the assembly illustrating additional details;

Figure 16 is a front view of a retainer employed for the filter above referred to;

Figure 17 is a top view of a part of the motor assembly illustrating a neutral position of the valve;

Figure 18 is a view showing the primary valve assembled with an operating lever;

This application is a continuation of my application, Serial No. 92,634, filed May 11, 1949 and now abandoned.

The motor structure exemplified in the drawings includes, among other things, a housing 1, a cover 2, a mounting frame 3 permanently secured to the housing, a valve body 4 detachably secured to the cover, a primary or throttle valve 5 carried by the valve body, mechanism or valving device 6 actuated by a driving shaft 7 for controlling a secondary valve 8, and a control unit 9 operatively connected to the primary valve.

The housing of the assembly may be designed and constructed as desired but, as herein illustrated, it is comprised of corresponding arcuate spaced apart parallel side walls 10 joined by a substantially semi-circular wall 11 to provide a chamber or raceway for a vane 12 clamped for rotation with the shaft 7. The junctions between the side and circular walls are curved as indicated at 13. The mounting frame and cover are each generally rectangular in shape, the frame 3 having an opening defined by an embracing flange 14. The arrangement is such that when the housing and bracket are permanently secured together such as by spot welds 15, the curved end portions of the flange will at least forcibly engage the housing and the upper marginal edges of the housing will lie in substantially the same plane as the upper planar surfaces of the mounting frame. More specifically in this respect, the convex side of the housing is pressed into the frame to temporarily hold the parts in a pre-assembled relationship, whereupon they are permanently united by any suitable fastening means.

Figure 5:
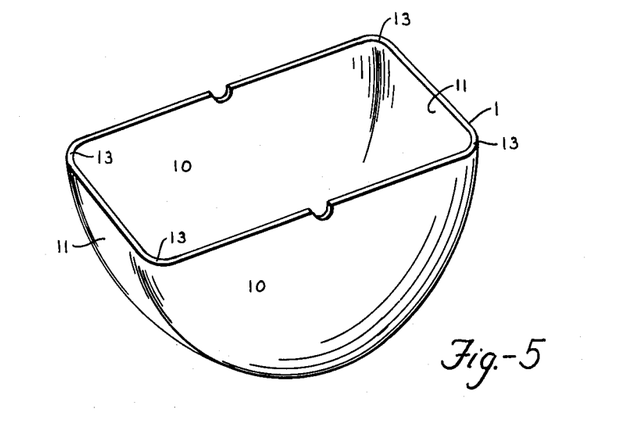

The sides of the frame are provided with concave seats 16 with tubular bearings 17 and 18 disposed therein for supporting the drive shaft 7. The bearing 17 is held in place by the valve body 4 and bearing 18 by a clamp 19, the latter being arranged within a notch 20 provided in the cover and directly connected to the frame by rivets 21. Clearance notches as illustrated in Figure 5 are provided in the side walls 10 of the housing for the shaft 7. The cover and mounting frame are preferably provided with ears 22 having aligned corresponding apertures through which bolts or other means may be extended to detachably mount the motor assembly on an appropriate part of the motor vehicle.

Figure 7:
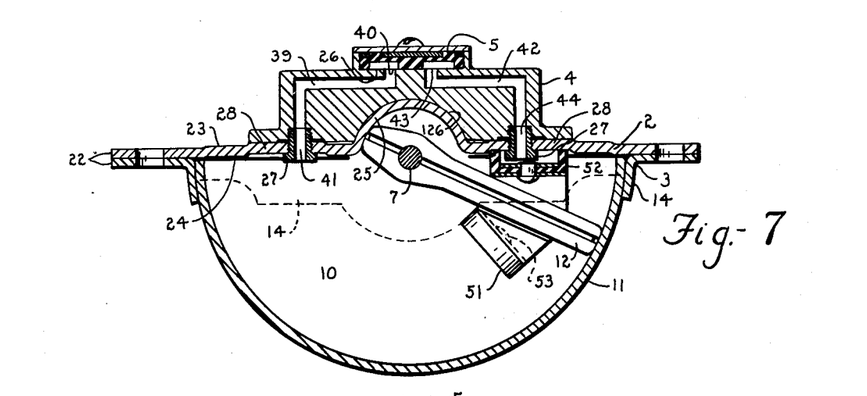
Figure 7 is a vertical section taken through an appropriate part of the motor assembly illustrated in Figure 6 showing various fluid passages and one position of the valve vane.
Figure 8:
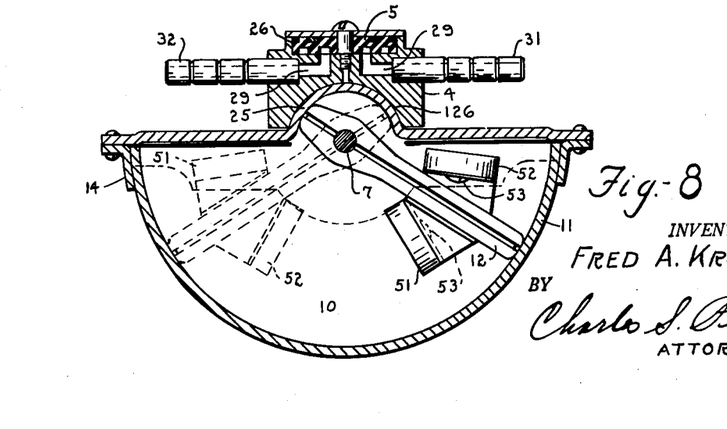
Figure 8 is a vertical section similar to Figure 6 showing other fluid passages and two different positions of the vane.

The frame and cover are preferably constructed of sheet metal and in order to insure a leak-proof raceway or chamber for the vane 12, the cover is preferably provided with a large rectangular recess 23 as illustrated in Figure 1, so that a gasket 24 with appropriate cut-outs can be clamped tightly between the upper marginal edges of the housing and the cover, as illustrated in Figures 7 and 8. The marginal edges of the gasket engage the marginal walls of the recess to retain the gasket in place. It will be noted that the cover is provided with a centrally disposed raised substantially semi-cylindrical portion 25 providing a smaller raceway or chamber for the upper part of the vane. In the present construction the housing, frame and cover are constructed of sheet aluminum, and consequently, from a practical standpoint, it is desirable to provide good hard travel surfaces resistant to wear for the vane. Although not essential, these hard surfaces in practice have been obtained by chromium plating.

The valve body 4 may be constructed as desired, but is preferably made in the form of a metal block provided with a substantially semi-cylindrical recess 26 of a size to snugly receive the cylindrical portion 25 formed on the cover, as exemplified in Figure 7. The ear ends of the valve body are preferably secured by screws 27 to circular bosses 28 formed on the cover. With this arrangement, the block or valve body is firmly anchored to the cover.

It is essential that the cover be maintained in a true or rigid condition so that the gasket 24 will intimately engage and properly seat against the upper marginal edges of the housing and the rectangular recess 23. Rigidity and stability is imparted to the cover at least in part by the cylindrical portion 25, rectangular recess 23 and the circular bosses 28.

The upper part of the valve block is provided with a circular recess 26, which rotatably receives the throttle or primary valve 5 above referred to. As will be pointed out hereinafter, the valve block is provided with a plurality of passages which communicate with the recess 26 and the chamber or raceway and to the secondary valve 8. The manual control unit 9 serves to actuate the throttle valve to control the operation of the motor. Parking of the wipers is also accomplished by proper manipulation of the control unit as will be pointed out hereinafter.

The unique arrangement of the various passages in the valve body or block will now be considered. The block is provided with a pair of aligned longitudinal passages 29, which communicate with the recess 26 by vertical passages 30 disposed on opposite sides of the center of the recess. The opposite ends of the longitudinal passages are preferably enlarged to receive nipples 31 and 32 in order that a flexible conduit may be connected to either of the nipples in the manner above described. More specifically in this respect, if the installation requires that a conduit 33 extending from the source of suction be connected to nipple 31, the other nipple 32 may be closed by a detachable rubber cap 34 as shown in Figure 2, and vice versa.

Figures 14, 15, 16, 17, 18:
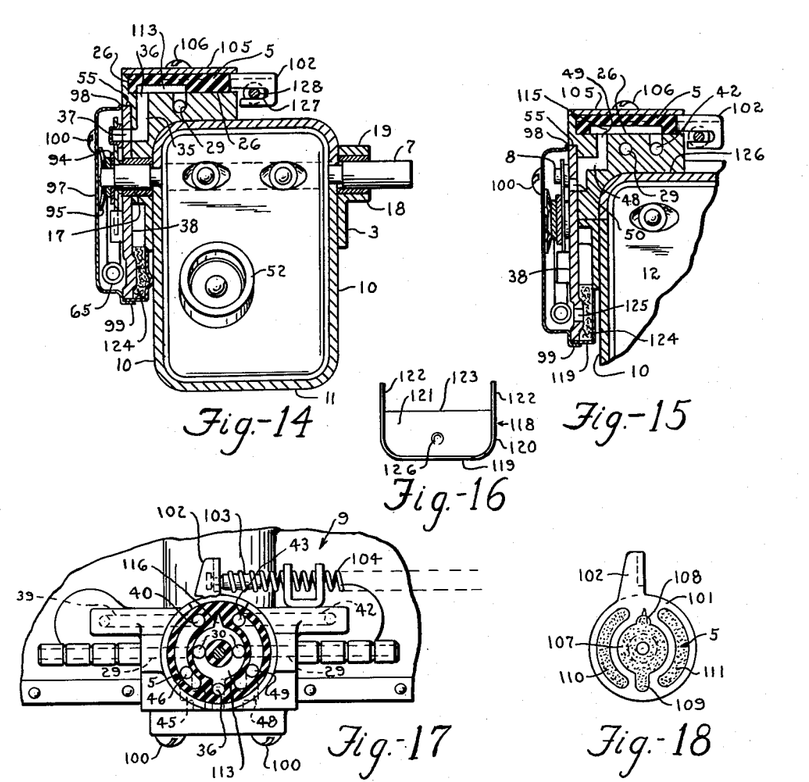

As illustrated in Figures 14, 17 and 18, the block is provided with an L-shaped vertical passage 35, the upper end of which communicates with the circular recess 26 at a port 36 equally spaced from the vertical passages 30, and its lower end connects with a center hole 37 provided in a mounting plate 38 for the mechanism 6. The block is also provided with a generally Z-shaped passage 39, one end of which communicates with the circular recess 26 at port 40 and its other end communicates with the chamber or raceway through the port 41 provided in the tubular screw 27. A passageway 42, similar to and aligned with passageway 39, communicates with the circular recess 26 at port 43 and a port 44 provided in the other tubular screw 27. It will be noted that the aligned passages 29 are arranged substantially parallel to the passages 39 and 42.

The valve block is further provided with a passageway 45, one end of which communicates with the circular recess 26 at a port 46, and its other end with an aperture 47 provided in the mounting plate 38 and spaced apart from the hole 37. A passageway 48, similar to passageway 45, communicates with the throttle valve recess at a port 49 and an aperture 50 provided in the plate 38 and spaced apart from the hole 37, the hole 37 and apertures 47 and 50 being operatively related to the secondary valve 8.

Cup-like resilient seals 51 and 52 are secured to the opposite sides of the vane 12 by suitable brackets and fastening means 53. Attention is directed to the fact that the cross-sectional dimension of each seal is somewhat less than the diameter of the bosses 28 formed on the cover 2 so that, for example, the end of each seal will engage the under flat surface of boss 28 to close the port 41 provided in the cover at one side of the vane, and the corresponding edge of the other seal will similarly engage a boss to close the port 44.

The mechanism 6 carried by the mounting plate 38 embodies improved principles of design and construction and will now be described.

Figure 4:
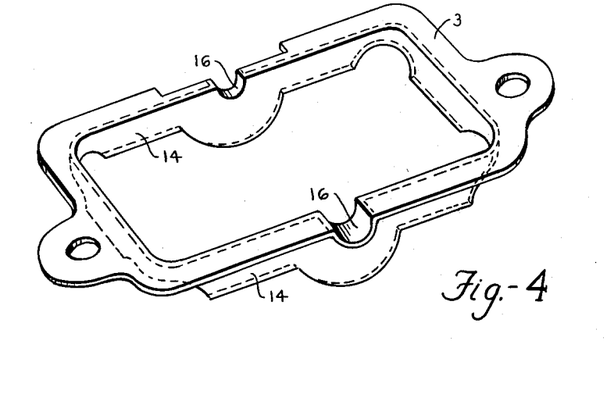
Figures 4 and 5 illustrate perspective views of the motor housing and mounting frame.
Figures 10, 11, 12:
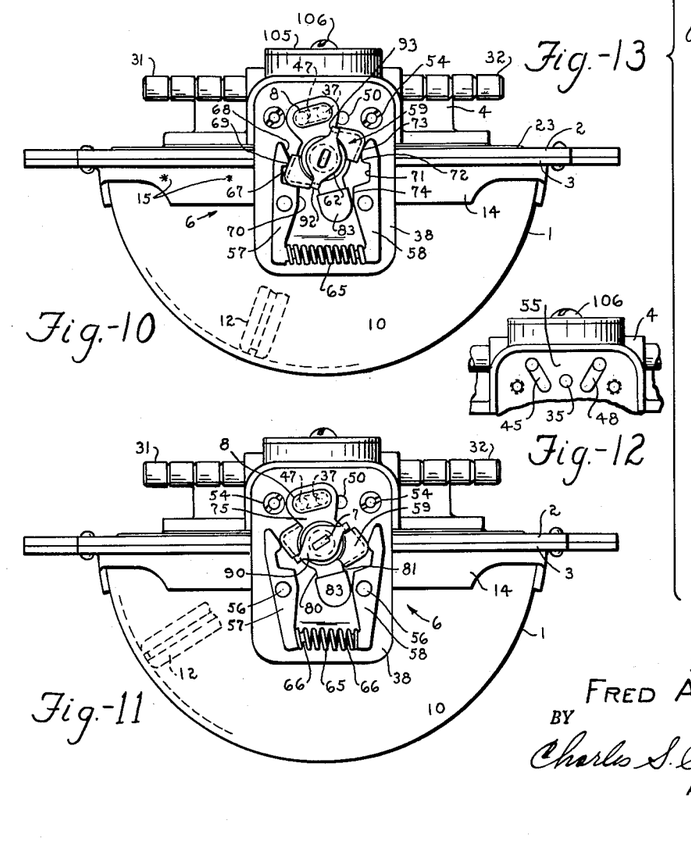
Figure 12 is a front view of a part of the primary valve housing disclosing the relationship of certain passageways or ports provided therein.

The mounting plate 38 and mechanism 6 are preferably associated together to constitute a subassembly which may be readily detachably connected to the motor block by screws 54. As illustrated in Figures 4, 12 and 14, the valve block is preferably recessed at 55 and the cover and frame with similar recesses to receive the upper extremity of the mounting plate 38. With this arrangement, the subassembly is firmly interlocked with the valve block. This is important from the standpoint of maintaining the hole 37 and apertures 47 and 50 in the mounting plate in registry with the passageways 35, 45 and 46, respectively.

The mounting plate is provided with an aperture which receives the shaft bearing 17. As illustrated in Figures 9 through 12, pivots 56 extend transversely through the mounting plate 38 and pivotally support a pair of corresponding rocker arms 57 and 58 for maintaining a cam member 59, rotatable on the shaft 7, in predetermined rotative positions in order that the fluid intended to circulate through certain of the passages will not be interrupted except at predetermined intervals. This cam member may be constructed as desired, but is preferably made by stamping same out of sheet metal stock, and includes a hub portion 62 and end extremities of substantially arrowhead or nose-like design. These extremities are provided with rearwardly extending walls to form generally V-shaped cams 63 and 64. The upper ends of the rocker arms 57 and 58 are continuously yieldably urged into engagement with the cams 63 and 64 by a helical expansible spring 65 carried by lugs 66 on the lower ends of the arms. The upper end of the rocker arm 57 is provided with a notch 67, an abutment 68, a crest 69 between notch 67 and abutment 68, and an abutment 70 adjacent the pivot 56. The rocker arm 58 is similarly provided with a notch 71, a crest 72 and abutments 73 and 74.

Figure 9:
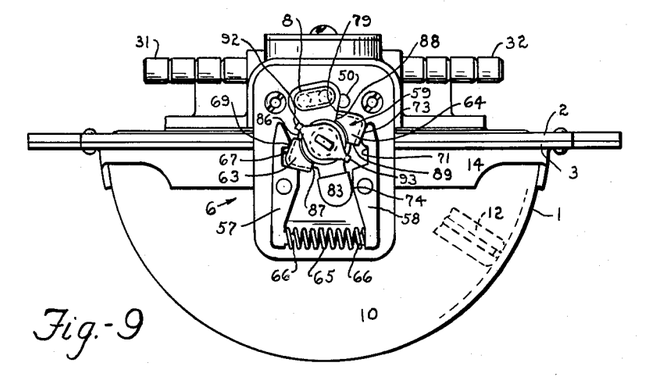
Figures 9, 10 and 11 are rear views of the motor assembly with certain parts removed to exemplify various operating positions of an improved valve operating mechanism.
Figure 13:
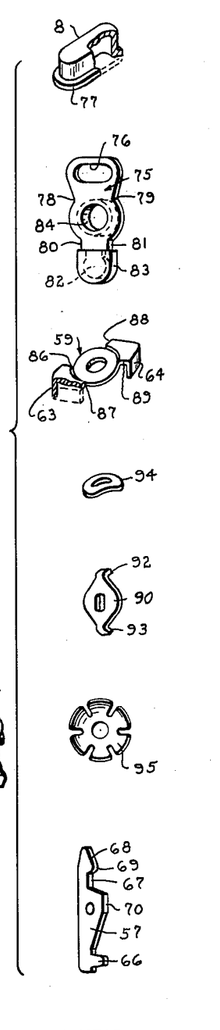
Figure 13 is a view showing various components of the valve operating mechanism.
Figure 19:
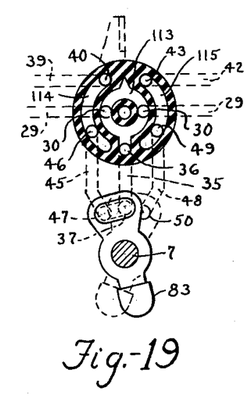
Figure 19 is a diagrammatic view illustrating two operating positions of the valve set-up.

An elongated oscillating member 75 carrying the secondary valve 8 is also rotatably mounted on the motor drive shaft 7 (see Figures 9 and 13). This oscillating member is provided with an upper head portion having an arcuate slot 76 therein which loosely receives the valve 8. The body of the valve is of hollow construction and includes a flange 77 which is disposed between the oscillating member and the front face of the mounting plate in order to prevent escape of the valve. This valve is operable to alternately place the hole 37 in the mounting plate in communication with first one and then the other of the apertures 47 and 50 as illustrated in Figure 19.

The oscillating member is provided with notches 78 and 79 adjacent the head portion and its other extremity or tail portion is provided with a pair of spaced abutments 80 and 81, and a tab 82 carrying a rubber bumper 83. The oscillating member is provided with a tubular portion 84 which preferably engages the end of shaft bearing 17 to maintain the member in predetermined spaced operative relationship to the parts to be engaged thereby. The front wall of one end of the cam member 59 is provided with a pair of notches 86 and 87, and a pair of corresponding notches 88 and 89 at its other end.

An elongated key member 90 is provided with an oblong opening which receives the inner oblong end of the drive shaft 7 so that the key will rotate therewith. This key member is provided with a pair of inturned lugs 92 and 93 which embrace the hub 62 of the cam member for cooperation with the notches therein. A washer 94 is carried by the shaft and is interposed between the cam member 59 and key 90, and a fingered resilient washer 95 is mounted on the said inner end of the shaft and serves to press and hold the cam, oscillating member and key member on the shaft when backed against a shroud or shield 97. It will be noted that the key 90 is arranged in the same general plane as the vane 12.

The shroud or shield 97 covers the valve operating mechanism 6 and includes a border flange 98 which is adapted to bear against mounting plate 38 and a lower inturned flange 99 which extends under and rearwardly of the plate. Screws 100 received in the inturned outer threaded ends of screws 54 serve to detachably secure the shield 97 in place. The front wall of the shield as stated above, is adapted to be engaged by the resilient washer 95 to retain parts of the secondary valve operating mechanism in proper assembly.

The primary valve 5 may be constructed in various ways but as herein illustrated, is preferably made round and of neoprene or some other desirable resilient material that will tend to automatically adjust and seal itself with respect to its seat. A metal lever having a round flat portion 101 is interlocked with the valve and includes an offset tab 102, the latter being provided with an opening which is adapted to receive a connector 103 attached to the inner end of helical flexible control member 104 constituting a component of the manual control unit 9. A plate 105 overlies the valve 5 and engages the valve block and holds the valve and lever assembled in the valve recess 26. A pivot screw 106 extends through plate 105, lever and valve and into the valve block. The interlock between the lever and valve is preferably accomplished by providing the upper side of the valve with a plurality of raised or elevated portions, including a round central portion 107 having diametrically disposed radial portions 108 and 109 and corresponding arcuate portions 110 and 111, all of such portions being received in clearance openings in the lever having shapes corresponding to these portions.

The throttle valve 5 is provided with a tubular center core portion 112 and its underside with an annular recess 113 surrounding the core. When the motor is in operating condition as exemplified in Figures 17 and 18, the passages 29 leading to the vacuum supply means and passage 35 leading to the secondary valve 8 will be placed in communication with the annular recess 113 through ports 30 and 36 respectively. The valve is further provided with a pair of separate corresponding arcuate recesses 114 and 115 disposed substantially concentric to the annular recess 113. Attention is directed to the fact that the annular recess is provided with diametrically disposed connecting recesses 116 and 117, which will be described more in detail subsequently. The annular recess is at all times in communication with the passages 29 leading to the vacuum means. Attention is further directed to the fact that these recesses substantially correspond in shape and size with the raised or elevated portions 107 through 111 provided on the upper surface of the resilient primary valve 5.

As clearly illustrated in Figures 14, 15 and 16, means are provided for filtering air which is introduced through any of the openings or apertures provided in the mounting plate 38 leading to the interior of the housing. The shield 95 is adapted to bear relatively tight against the outer face of the mounting plate to provide a substantially fluid-tight construction so that any air that is admitted into the housing or raceway through the apertures or openings in the mounting plate will have to pass through the filter. The filtering means may be designed and constructed as desired but as illustrated, includes a receptable 118 having a bottom wall 119, end walls 120, and a back wall 121. The end walls 120 are provided with upwardly extending continuations 122. The end walls 120 and the continuations 122 are adapted to embrace the side edges of the mounting plate and the upper transverse marginal edge 123 of the back wall may engage the frame 3. The bottom wall 119 is adapted for disposition between the lower marginal end of the mounting plate 38 and the inturned flange 99 of the shield 95 in order to retain the receptacle 118 in place. A piece of felt 124 or the equivalent is normally firmly held in the receptacle 118 and when the receptacle is in place as just described, the felt will be maintained in position over one or more holes 125 provided in the lower extremity of the mounting plate 38. It will be noted that the lower extremity of the plate is slightly offset inwardly, the purpose of which is to provide clearance for proper movement of the actuating spring 65. The hole 125 is provided in this offset and the latter also assists in slightly compressing the felt so that any air admitted to the hole 125 will be required to pass through the felt to filter the air and prevent the admission of any foreign matter into the raceway. Attention is directed to the fact that there is a relatively loose fit between the receptacle 118 and the mounting plate, the purpose of which is to permit the air to seep or flow into the receptacle. If found desirable, the back wall 121 of the receptacle may be provided with a projection 126 whereby to assist in maintaining the receptacle in proper assembly with the mounting plate.

The opening in the tab 102 includes a slot 127 so that the reduced portion 128 of the connector 103 may be received in the slot and the tab 102 will be held between abutments 129 provided on the connector. With this arrangement, a detachable easily workable coupling or connection is established between the flexible control member 104 and the tab 102 of the primary valve 5. The connector 103 is preferably of a diameter not in excess of the diameter of the flexible member 104 in order that the connector will pass through threaded apertures formed in the legs 130 of a fitting 131 secured to the valve block 4 by a screw 132. The flexible member threadedly engages the threaded apertures and is of such a character that a knob 133 adjacent its outer end may be disposed in any location on the instrument panel desired for convenient operation, for example, at the top or front as illustrated in Figure 1 of the drawing. Attention is directed to the fact that the valve block is provided with a threaded opening 134 so that the fitting 131 may be connected to another part of the block depending on which of the nipples 31 and 32 is connected to the vacuum means.

The outer end of the flexible member as herein illustrated preferably carries a tubular bushing 135 having an enlarged end 136 provided with a set screw 137 for detachably securing the bushing to the flexible member. A flanged exteriorly threaded bearing 138 is secured to the reduced portion of the bushing by flaring outwardly the inner end of the bushing at 139 in a manner to permit relative rotation between the bushing and bearing. The bushing and bearing are adapted to extend through an aperture provided therefor in an instrument panel 140 with the flange 141 of the bearing engaging the front surface of the panel. A washer 142 engages the rear side, and a nut 143 engages the bearing to lock the parts to the panel. The knob 133 is secured to the enlarged portion 136 of the bushing by means of a screw 144 which extends axially through the knob and is threadedly received in the threads formed by the flexible member 104. An annular recess 145 in the knob is enlarged at 146 in order that the set screw 137 may extend therein to further make certain that the knob will rotate with the bushing. The knob is provided with a pair of knurled annular portions 147 and 148, one of which is larger than the other. With this arrangement, it will be evident that the flexible member may be rotated more rapidly by fingering the smaller knurled portion 147 than when the larger portion is engaged.

The manual control unit 9 provides means whereby the throttle or primary valve 5 may be accurately controlled to govern the operation of the motor. The operation of the motor and parking features thereof are comparatively simple and will now be described.

Figure 20:
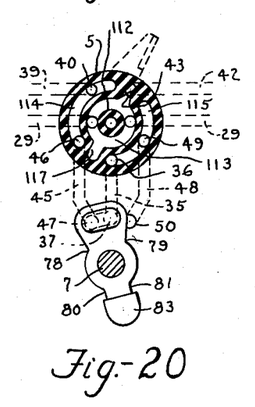
Figure 20 shows the manner in which parking of a wiper is obtained.

As stated above, the annular recess 113 formed in the under side of the throttle valve 5 is at all times in communication with the vacuum means. When the throttle valve 5, secondary valve 8 and the various components of the mechanism 6, including the vane 12 are in the positions illustrated in Figures 7 and 20, the motor shaft will be held against movement to operate a wiper arm and blade, this being due to the fact that the recess 113 is not connected with the port 36 in the motor block leading to the hole 37 in the mounting plate through passage 35, and when the secondary valve is carried over to the position illustrated, the passages 39, 45, 35 and 48 will be vented to the atmosphere through the aperture 50 in the mounting plate so that vacuum is created through port 44. More specifically, when the throttle valve 5 is in such position, the recess 113 will be placed in communication with the port 43 which connects with port 44 in screw 27 through passage 42, all of which will cause the cup seal 52 to be drawn intimately against the boss 28 and thereby maintain the motor shaft 7, and the wiper arm and blade operatively connected thereto, in a parking position until the valve 5 is moved to place recess 113 in communication with port 36 as illustrated Figures 17 and 19. The cup seal 52 also serves to prevent seepage of air from the raceway or chamber into the port 44 and further acts to cushion the parking stroke of the vane.

Moreover, it will be noted that when the vane is in the parked position just described or as illustrated in Figure 9, the cam 63 of member 59 will be caught in the notch 67 of rocker arm 57 and cam 64 will be disposed between notch 79 on the head portion of oscillating member 75, and the abutment 73 on the upper end of rocker arm 58, and that the rubber bumper 83 on the tail portion of the oscillating member will engage the abutment 74 on this rocker arm. Whenever the throttle valve is moved by the manual control unit 9 so that the recess 113 takes a position opposite to that illustrated in Figure 20, the recess 117 of recess 113 will be located between ports 36 and 49 in the valve block, the seal 51 on vane 12 will be drawn against the other boss 28 to close the port 41 provided in the other screw 27, so that depending on the hook-up or installation of the motor the vane will be parked in a position directly opposite to that illustrated in Figure 7. When so parked the aperture 47 in the mounting plate will be exposed to the atmosphere and passage 39 connected to port 41 in the screw and port 40 in the block will be placed in communication with the vacuum through recess 113 which is at all times connected to the vacuum.

Also the cam member and oscillating member will assume reversed positions with the cam 64 in notch 71 of rocker arm 58, cam 63 bearing on abutment 68 at the upper end of rocker arm 57, notches 86 and 89 on the cam member respectively engaging notch 78 and abutment 81 on the oscillating member 75, and the bumper 83 on the oscillating member bearing against abutment 70 on the rocker member 57. This rubber bumper serves to eliminate noise.

To operate the motor, the throttle valve 5 is rotated to the position illustrated in Figures 17 and 19 by the flexible member 104 to connect the annular recess 113, which is at all times in communication with the vaccum, with port 36 through recess 117, port 36 leading to hole 37 in the mounting plate through passage 35, thereby connecting the secondary valve 8 with hole 37 and aperture 47 in the mounting plate, aperture 47 with port 46 through passageway 45, port 46 to port 40 through arcuate recess 114 in the valve, and port 40 to port 41 in the screw 27 through passageway 39, to establish a through line of communication from passage 29 to secondary valve 8 and port 41 to cause the vane 12, previously in the parked position in Figure 7, to be sucked to the left as exemplified by the dotted lines in Figures 8, 10 and 11. The moment the secondary valve 8 is moved over aperture 50 in the mounting plate, port 44 in the other screw 27 is placed in communication with the vacuum to cause the vane to move back to the right as indicated in Figure 8. More particularly in this respect, communication is established between port 44 and port 43 through passageway 42, port 43 to port 49 through arcuate recess 115 in valve 5, port 49 to aperture 50 through passageway 48, aperture 50 to hole 37 through valve 8, hole 37 to port 36 through passageway 35, and port 36 to passages 29 and the vacuum through recess 113. As the vane moves farther to the right, the lugs 93 and 92 and the key 90 will respectively engage the notches 89 and 86 on the cam member 59 causing the cam member to move with the shaft and cams 63 and 64 to again engage the crests 69 and 72 on the rocker arms, and, just before the vane completes its stroke the cam member will snap in a counter-clockwise direction causing cams 64 and 63 to simultaneously respectively strike against notches 79 and abutment 81 on the oscillating member to assume a position directly opposite to that in Figure 9 and so that the cams and oscillating member will engage the rocker arms in the same manner as stated above when the vane is parked to the left side of the housing chamber or raceway.

When the throttle valve is in the position illustrated in Figures 17 and 19, the vane will be caused to automatically oscillate within the chamber to actuate the drive shaft 7. It is of course to be understood, that when the valve is in the position just referred to, the shaft will be oscillating at its maximum speed. To reduce the rate of oscillation, it is merely necessary to move the throttle valve 5 in a direction to reduce the strength of the suction at the ports 41 and 44 provided in the screws 27. The recess 116 communicating with recess 113 is preferably V-shaped so that the passage of air between recess 113 and either of the ports 40 and 43 leading to passages 34 and 42 may be easily regulated, and so that the wiper arm and blade assembly may be eased or slowly moved to the desired parking position.

As the vane moves to the left as illustrated in Figure 10, the lugs 92 and 93 on the key or driver 90 will respectively engage the notches 87 and 88 on the cam member 59 to force the cam member to rotate with the shaft 7 and cause the cams 63 and 64 to engage the crests 69 and 72 on the spring pressed rocker arms 57 and 58, and just before the vane completes its final upward stroke as illustrated in Figures 8 and 11, the cam member 59 will be caused to snap in a clockwise direction to cause the notches 86 and 89 on the cam member to respectively engage the notch 78 on the head portion of the oscillating member 75 and abutment 81 on the tail portion thereof, and flip the oscillating member over so that the secondary valve 8 will communicate with hole 37 and aperture 50 provided in the mounting plate, exposing aperture 47 to the atmosphere.

Attention is directed to the fact that since the secondary valve 8 is in communication with the vacuum, it will be drawn toward the mounting plate and its flange 77 will act as a seal as it slides over the outer face of the mounting plate.

Figure 6:
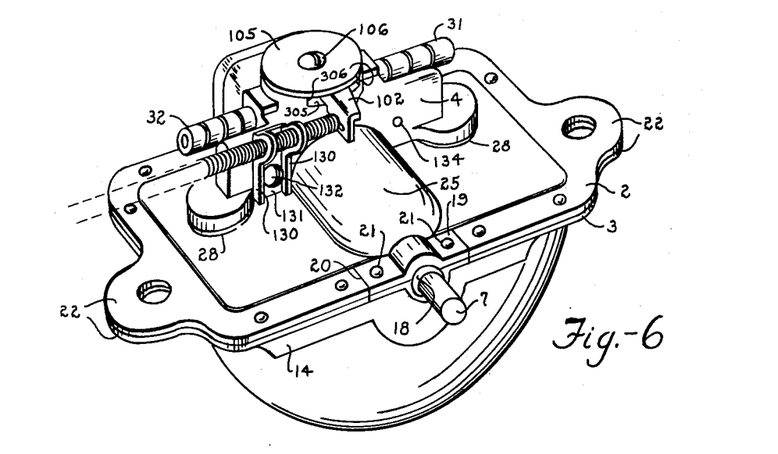
Figure 6 is a perspective view of the motor assembly.
Figure 21:
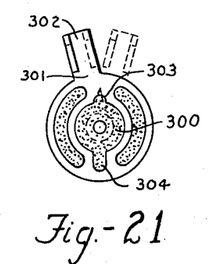
Figure 21 discloses a modified way of assembling the primary valve with its operating lever in order that parking of the wiper arm and blade assembly may be accomplished to meet certain requirements with respect to installing the motor.

Figure 21 of the drawing exemplifies a modified way of operatively connecting a primary valve 300 with an operating lever 301. In this modification, the tab 302 of the lever is offset approximately at a 15 degree angle with respect to a line passing through the center of the valve and raised or elevated portions 303 and 304 thereof. With this arrangement, the lever may be assembled with the valve as illustrated to predetermine the travel or movement of the valve and lever assembly in one direction depending on one installation. The construction also permits assembly of the lever with the valve in a reverse or alternative position as exemplified by the dotted lines, so that the travel or movement of the valve may be predetermined for a different installation. In other words, the valve and lever of this modified construction may be assembled to meet various installation requirements. In this connection, attention is directed to the fact that the valve body is provided with a notch 305 as illustrated in Figure 6, which limits the rotational movement of the valve by reason of the fact that the abutments 306 formed by the notch may be engaged by the tab of either lever.

It will also be obvious that the frequency of oscillation of the wiper arm is varied by the control.

Having thus described my invention, it is obvious that various modifications may be made in the same without departing from the spirit of the invention, and, therefore, I do not wish to be understood as limiting myself to the exact forms, construction, arrangements, and combinations of parts herein shown and described and defined in the claims.

I claim:

1. A windshield wiper motor comprising a housing having a chamber, a vane movable in the chamber, a valve body carried by the housing and having a pair of passageways communicating with the chamber, a first port connected to one passageway and a second port connected to the other passageway, a pair of ports either of which is connectible with a source of vacuum, a valve carried by the body and manually movable in one direction for controlling the vacuum from a selected one of said pair of ports through said one passageway and movable in another direction for controlling the vacuum from the other selected port of said pair of ports through said other passageway.

2. A windshield wiper motor comprising a body having a chamber and a pair of passageways communicating with the chamber, a piston movable in the chamber, a first port connected to one passageway and a second port connected to the other passageway, a pair of ports either of which is connectible with a source of vacuum, a valve carried by the body and manually movable in one direction for controlling the vacuum from a selected one of said pair of ports through said one passageway and movable in another direction for controlling the vacuum from the other selected port of said pair of ports through said other passageway.

3. A windshield wiper motor comprising a body having a chamber and a pair of passageways communicating with the chamber, a piston movable in the chamber, a first port connected to one passageway and a second port connected to the other passageway, a pair of ports, tubular elements respectively connected to said pair of ports for connecting either port with a source of vacuum, a valve carried by the body and manually movable in one direction for controlling the vacuum from a selected one of said pair of ports through said one passageway and movable in another direction for controlling the vacuum from the other selected port of said pair of ports through said other passageway and means for closing the tubular element which is not connected to the source of vacuum.

4. A windshield wiper motor comprising a body having a chamber and a pair of passageways communicating with the chamber, a piston movable in the chamber, a first port connected to one passageway and a second port connected to the other passageway, a pair of ports either of which is connectible with the source of vacuum, a valve carried by the body, a pair of means on the body located on opposite sides of the valve, a manual control, a fitting connecting the manual control with one of said means so that the control can be attached to the valve in one position for moving the valve in one direction for controlling the vacuum from a selected one of said pair of ports through said one passageway, and said fitting being connectible with the other means so that the control can be attached to the valve in a different position for moving the valve in another direction for controlling the vacuum from the other selected port of said pair of ports through said other passageway.

5. A windshield wiper motor comprising a housing having a chamber, a piston movable in the chamber, a valve body carried by the housing, said body having a recess and a pair of passageways communicating with the chamber and recess, said body also having a pair of passages communicating with the recess and disposed so that either passage can be connected with a source of vacuum, a valve seated in the recess and manually movable in one direction for controlling the vacuum from one of said passages through one passageway and movable in another direction for controlling the vacuum from the other passage through said other passageway.

6. A windshield wiper motor comprising a housing having a chamber, a piston movable in the chamber, a valve body carried by the housing, said body having a recess and a pair of passageways communicating with the chamber and recess, said body also having a pair of passages communicating with the recess and disposed so that either passage can be connected with a source of vacuum, a valve seated in the recess and manually movable in one direction for controlling the vacuum from one of said passages through one passageway to park the piston in one position and movable in another direction for controlling the vacuum from the other passage through said other passageway to park the piston in another position, and said valve when located substantially mid-way between the limits of its travel serving to prevent movement of the piston to such positions.

7. A windshield wiper motor comprising a housing having a chamber, a piston disposed in the chamber, a shaft supporting the piston for oscillatory movement in the chamber said housing having a pair of passageways communicating with the chamber and a port for communication with a source of vacuum, and a rotary valve carried by the housing and movable in a plane substantially parallel to the shaft axis for controlling the vacuum through either passageway to the port so that the piston can be parked in different positions.

8. A windshield wiper motor comprising a body having a chamber and a pair of passageways communicating with the chamber, a piston movable in the chamber, a pair of ports either of which is connectible with a source of vacuum, a valve carried by the body and movable in one direction for controlling the vacuum from a selected one of said pair of ports through one passageway and movable in another direction for controlling the vacuum from the other selected port of said pair of ports through the other passageway.

9. A windshield wiper motor comprising a housing having a chamber, a piston movable in the chamber, said housing having a recess and a pair of passageways communicating with the chamber and recess, said housing also having a pair of passages communicating with the recess and disposed so that either passage can be connected with a source of vacuum, a valve seated in the recess and movable in one direction for controlling the vacuum from one passage through only one passageway to park the piston in one location and movable in another direction for controlling the vacuum from the other passage through only said other passageway to park the piston in a different location.

10. A windshield wiper motor comprising a housing having a chamber, a piston movable in the chamber, said housing having a recess and a pair of passageways communicating with the chamber and recess, said housing also having a pair of passages communicating with the recess and disposed so that either passage can be connected with a source of vacuum, a valve seated in the recess and movable in one direction for controlling the vacuum from one of said passages through only one passageway to park the piston in one position and movable in another direction for controlling the vacuum from the other passage through only said other passageway to park the piston in another position, and said valve when located substantially mid-way between the limits of its travel serving to prevent parking of the piston in such positions.

11. A windshield wiper motor comprising a housing having a chamber, a piston movable in the chamber, a seat provided on the housing, passageways communicating with the seat and chamber, a pair of passages communicating with the seat and adapted for connection with a source of vacuum, and a valve mounted on the seat and movable to one position to control the vacuum from one passage through only one passageway to park the piston in one location and movable to another position to control the vacuum from the other passage through only the other passageway to park the piston in a different location.

12. A windshield wiper motor comprising a body having a chamber and a pair of passageways communicating with the chamber, a piston movable in the chamber, a first port connected to one passageway and a second port connection to the other passageway, a pair of ports either of which is connectible with a source of vacuum, a valve carried by the body, a pair of means on the body located on opposite sides of the valve, a fitting connected to one of said means so that a manual control adapted for support on the fitting can be attached to the valve in one position for moving the valve in one direction for controlling the vacuum from a selected one of said pair of ports through said one passageway, and said fitting being disconnectible from said one means and connectible to the other means so that such a control can be attached to the valve in a different position for moving the valve in another direction for controlling the vacuum from the other selected port of said pair of ports through said other passageway.

13. A windshield wiper motor comprising a body having a chamber and a pair of passageways communicating with the chamber, a piston movable in the chamber, a pair of passages either of which is connectible with a source of vacuum, a valve carried by the body, a pair of spaced means provided on the body, an actuator connectible to one of said spaced means for moving the valve in one direction to control the vacuum from a selected one of said pair of passages through one passageway, and said actuator also being disconnectible from said one means and connectible to the other of said means for moving the valve in another direction to control the vacuum from the other selected passage through the other passageway.

14. A windshield wiper motor comprising a housing having a chamber, a piston movable in the chamber, said housing having a pair of passageways communicating with the chamber and a pair of ports for selective communication with a source of vacuum, and a valve having a recess common to and connecting the pair of ports, said valve being movable to either of two operative positions to selectively connect either of the passageways with the common recess to control the vacuum through the passageway selected.

15. A windshield wiper motor comprising a housing having a chamber, a piston movable in the chamber, a seat provided on the housing, said housing also having a pair of passageways communicating with the seat and chamber and a pair of passages communicating with the seat and adapted for selective connection with a source of vacuum, and a valve mounted on the seat, said valve being provided with a recess common to and connected with said pair of passages and disconnected from said passageways when the valve is in one position, said valve being movable to a second position to control the vacuum from one passage through only one passageway by connection through the recess, and said valve being movable to a third position to control the vacuum from the other passage through only the other passageway by connection through the recess.

16. A windshield wiper motor comprising a housing having a chamber, a piston movable in the chamber, said housing having a pair of passages communicating with the chamber and a pair of ports for selective communication with a source of vacuum, and a valve having a recess common to and connecting the pair of ports, said valve also having a pair of separate recesses respectively connectible with said passages, said valve being movable to a position to effect a disconnection of one separate recess with one passage and selectively connect said one passage with the common recess to control the vacuum through this passage and said valve also being movable to another position to effect a disconnection of the other separate recess with the other passage and connect said other passage with the common recess to control the vacuum through said passage.

17. A windshield wiper motor comprising a housing having a chamber, a piston movable in the chamber, said housing having a seat and a pair of passageways extending from the chamber to the seat, a pair of outer passages extending from the seat and terminating at a predetermined location, a center passage extending from the seat and terminating at said location between said outer passages, a pair of ports extending from the seat for selective communication with a source of vacuum, an oscillatable secondary valve operable by the piston for alternately establishing communication between said center passage and either of said outer passages, and a primary valve having a recess common to the pair of ports and connectible with the center passage, said valve also having a pair of separate recesses, said primary valve being movable to one position to connect the center passage with the common recess so that when the secondary valve is alternately connected with the outer passages these passages will be alternately respectively connected to the passageways through said separate recesses to cause movement of the piston by differential pressures thereagainst when either of the ports is connected with a vacuum, said primary valve also being movable to a second position to disconnect the center passage and common recess and connect the separate recesses through the center passage and one outer passage through the secondary valve and establish connection between the common recess and only one of the passageways to control the vacuum through this passageway to effect a parking of the piston in one position, and said valve being movable to a third position to produce a reversal of the functions resulting from the second position of the primary valve to effect a parking of the piston in a different position.

References Cited in the file of this patent

UNITED STATES PATENTS

| | | |
|---|---|---|
| 1,036,558 | Butz | Aug. 27, 1912 |
| 1,616,287 | Stone | Feb. 1, 1927 |
| 1,738,311 | Oishei et al. | Dec. 3, 1929 |
| 2,257,249 | Thomas | Sept. 30, 1941 |
| 2,378,320 | O'Shei | June 12, 1945 |
| 2,602,430 | Bell | July 8, 1952 |

FOREIGN PATENTS

| | | |
|---|---|---|
| 268,020 | Great Britain | Mar. 21, 1927 |
| 473,296 | Great Britain | Oct. 11, 1937 |
| 697,976 | France | Nov. 5, 1930 |